Figure 1:
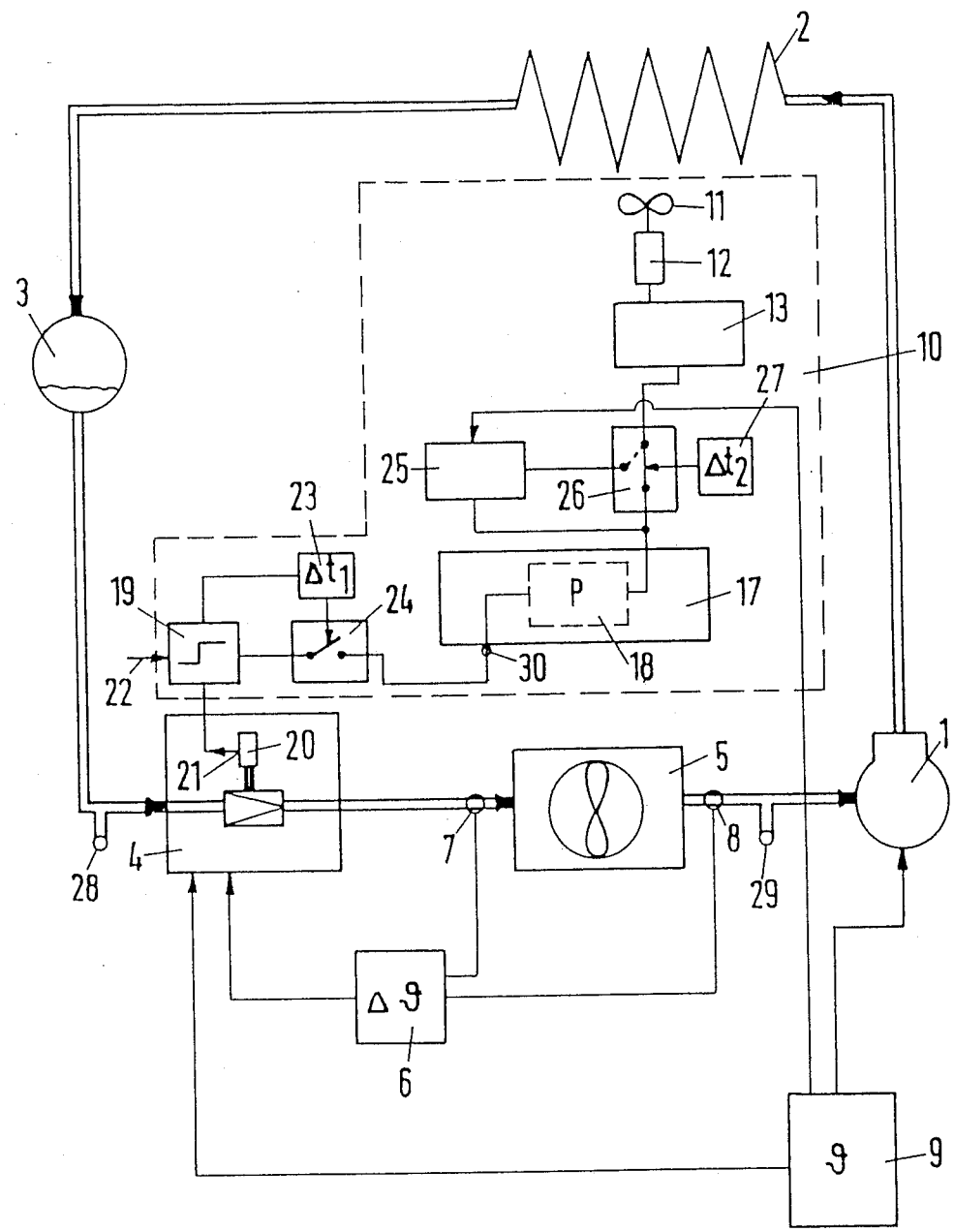

United States Patent [19]

Thuesen et al.

[11] Patent Number: 4,966,006
[45] Date of Patent: Oct. 30, 1990

[54] REFRIGERATION PLANT AND METHOD OF CONTROLLING A REFRIGERATION PLANT

[75] Inventors: Sven E. Thuesen, Nordborg, Denmark; Klaus Gollnow, Rödermark, Fed. Rep. of Germany

[73] Assignee: Danfoss A/S, Nordborg, Denmark

[21] Appl. No.: 408,082

[22] Filed: Sep. 15, 1989

[30] Foreign Application Priority Data

Sep. 22, 1988 [DE] Fed. Rep. of Germany ....... 3832226

[51] Int. Cl.⁵ ............................................. F25B 41/04
[52] U.S. Cl. ........................................ 62/89; 62/183; 62/216
[58] Field of Search ................. 62/DIG. 17, 181, 184, 62/188, 89, 216

[56] References Cited

U.S. PATENT DOCUMENTS 2,787,130  4/1957  Kaufman .................................. 62/225
4,590,772  5/1986  Nose et al. ...................... 62/DIG. 17

Primary Examiner—William E. Wayner
Attorney, Agent, or Firm—Wayne B. Easton; Clayton R. Johnson

[57] ABSTRACT

The refrigeration plant disclosed herein includes an evaporator, a compressor connected to the outlet of the evaporator, a condenser connected to the outlet of the compressor, a controllable expansion valve connected to the outlet of the condenser and having its outlet connected to the evaporator and condenser pressure controls for providing at the least possible condenser pressure, the degree of opening of the expansion valve to obtain an optimum ratio between the condenser pressure and the evaporator evaporator performance. That is, the degree of opening of the expansion valve lies in a range giving the least possible condenser pressure.

15 Claims, 3 Drawing Sheets

REFRIGERATION PLANT AND METHOD OF CONTROLLING A REFRIGERATION PLANT

The invention relates to a refrigeration plant comprising an evaporator, a compressor connected to the outlet of the evaporator, a condenser connected to the outlet of the compressor, a controllable expansion valve connected to the outlet of the condenser and having its outlet connected to the evaporator, and a condenser pressure control apparatus, as well as to a method for controlling this refrigeration plant.

Such a refrigeration plant and method are known from EP-A 66 553. The condenser pressure is controlled by changing the fan speed depending on the super heating temperature of the evaporator and the temperature of the cooling medium at the condenser outlet. Further, this specification discloses the control of the expansion valve by the same differential temperature across the evaporator, i.e. the super heating temperature.

The disadvantage of such a control is that the degree of opening of such an expansion valve cannot always be kept within an operating range that ensures an optimum ratio between the condenser pressure and the evaporator output. The plant is thereby operated at a higher condenser pressure than would be necessary if the entire operating range of the expansion valve could be utilized. If the condenser pressure is not kept at its optimum range, the energy consumption of the compressor and possibly of the fan are not at an optimum.

Another problem is that the degree of noise must stay below certain valves at particular times, depending on the nature of surrounding buildings (residential area). To reduce the acoustic pressure, one can use a condenser-fan combination with a lower volume of air and increased condenser area in order to achieve the desired refrigeration effect. However, this makes the plant considerably more expensive.

Another possibility is to lower the fan speed, for example for nighttime operation. However, this solution does not ensure an optimum condenser pressure in relation to the instantaneous evaporator performance.

Another refrigeration plant and a method for operating same known from EP-A 152 608. In this case, the flow of air of the fans and hence the condenser pressure are regulated by the temperature of the sucked in air and/or the momentary refrigeration effect of the compressors. In this plant, the condenser is again not operated at the optimum pressure adapted to the momentary refrigeration performance of the evaporator.

It is the problem of the present invention to provide a control for a refrigeration plant such that, at an optimum ratio between the condenser pressure and the evaporator performance, the degree of opening of the expansion valve lies in a range giving the least possible condenser pressure.

In a refrigeration plant of the aforementioned kind this problem is solved in that the condenser pressure control apparatus controls the condenser pressure depending on the degree of opening of the expansion valve.

In this way, the condenser pressure is only increased when the required power of the evaporator can no longer be covered by opening the expansion valve further. The expansion valve can be controlled in conventional manner by the super heat temperature of the evaporator. Since it is only the degree of opening of the expansion valve that has to be determined, the control according to the invention can be installed in existing refrigeration plants.

In a preferred embodiment, the condenser pressure control apparatus comprises a control circuit and a fan with a variable adjustable air flow which can be set by way of a fan control connected to the control circuit. The volume of air can be changed by varying the rotary speed, by varying the angle to which the blades of the fan are set, or by varying the flow resistance by means of throttle flaps in the air stream.

Another preferred possibility of controlling the condenser pressure has been found to be a valve which is disposed at the outlet of the condenser and can be set by the control circuit by way of a valve control. If the opening cross-section of the valve is reduced, the liquid builds up in the condenser and thereby reduces the area available for dissipating heat from the gaseous cooling medium. This increases the pressure in the condenser.

Preferably, a limiting value element is provided between the expansion valve and the control circuit. It detects the degree of openings of the expansion valve as determined by a degree of opening notifier and, when exceeding a predetermined degree of opening, activates the control circuit. Below the predetermined degree of opening, the condenser will in every case operate at the pressure determined, inter alia, by the air temperature and the speed of the fan.

In particular, it is preferred that the control circuit comprise a P regulator which forms the output value of the control circuit depending on the degree of opening of the expansion valve according to the formula $$A = A_{max}\left(1 - K\frac{O - V}{O_{max} - V}\right)$$

wherein A is the instantaneous output value, $A_{max}$ is the maximum output value, K is a constant, A is the instantaneous degree of opening, V is the predetermined degree of opening and $A_{max}$ is the maximum degree of opening. This control is simple to bring about and ensures that the output quantity of the control circuit controls the control circuit and the fan or the condenser outlet valve in a manner which produces the minimum condenser pressure up to a manner which produces the maximum condenser pressure when the expansion valve opens from a predetermined degree of opening up to a maximum degree of opening. At the maximum degree of opening, the condenser pressure is a maximum, i.e. the fan has to produce the least adjustable volume of air.

It is of particular advantage if the predetermined degree of opening can be set to at least two fixed values. This, for example, makes it possible to have one plant which maintains the prescribed noise levels which differ for day and night. The predetermined degree of opening can, for example, be smaller at night than during the day.

Advantageously, there is a delay element between the limiting value element and the control circuit for delaying activation of the control circuit after exceeding the predetermined degree of opening for a predetermined duration. Since the invention provides two controls or regulating circuits which are partially dependent on each other for the circuit of the cooling medium, it is possible for oscillations to occur if no dead period is provided. This dead period is preferably provided in conjunction with the control of the condenser pressure to permit fitting to existing systems.

Preferably, provision is made for a room temperature sensor, which switches the compressor and/or the expansion valve off and on depending on the room temperature, and a store which is connected to the room temperature sensor and stores the output valve of the control circuit and, when switching on again, delivers the stored value as the output value to the control circuit. In thermostatically controlled plants, it is necessary for the output value of the control circuit to be retained at the instant when the expansion valve and compressor are switched off and, on switching on again, that the valve and compressor retain this value until the plant has stabilized itself again.

It is of particular advantage to provide a delay apparatus which connects the outlet of the control circuit to the fan control or the valve control a certain time after switching on again. This ensures that the outlet of the control circuit is employed for influencing the condenser pressure only when the part of the refrigeration plant consisting of the expansion valve, evaporator and compressor is in a run-in condition.

In another preferred embodiment, a further evaporator which is connected to a further expansion valve is disposed between the condenser and compressor parallel to the first evaporator and first expansion valve, the condenser pressure control apparatus comparing the degrees of valve opening of the expansion valves and controlling the condenser pressure depending on the degree of opening of that expansion valve which has the largest degree of opening. Such a control is of particular advantage when several rooms or room sections are to be cooled by a central compressor with a downstream condenser. Since one aim of the control is to reduce the energy consumption by always keeping the condenser pressure at an optimum level but every evaporator must fulfil its function, that is to say adequately cool its room section or room, it is desirable to control the condenser pressure depending on the evaporator section of which the expansion valve has the largest degree of opening.

Advantageously, the condenser pressure control apparatus comprises a multiplex for the time serial scanning of the degrees of valve opening. This is a simple manner of serially processing the individual degrees of opening.

It is of particular advantage for the expansion valve to be a pulse-controlled valve and for the opening notifier to determine the degree of opening from the pulse/pause ratio. Such pulse-controlled valves are, for example, known from BP-A 171 240 or EP-A 123 643. The pulse-pause ratio is readily found and digitally processed.

A method for controlling a refrigeration plant in which a cooling medium evaporates in an evaporator, is compressed in a compressor, is liquified in a condenser and is returned to the evaporator by way of an expansion valve with an adjustable degree of opening, is characterised in that the condenser pressure is controlled depending on the degree of opening of the expansion valve.

This desirably controls the condenser pressure in an optimum working range so that the compressor output required to ensure the condenser pressure possibly also the fan output as well as the generation of noise can be minimised.

In a preferred embodiment of the method, the degree of opening of the expansion valve is controlled depending on the super heating temperature of the cooling medium in the evaporator.

Preferably, the control sets in only after a predetermined minimum value of the degree of opening. Below this minimum value, i.e. when the expansion valve has only a small degree of opening, it is not necessary for the control to set in because the condenser pressure can be controlled in a conventional manner.

In particularly preferred for the predetermined minimum value to be varied according to time. This permits one to ensure that different noise levels can be maintained if the plant runs during the day and night.

Preferably, the control sets in only a predetermined time after exceeding the predetermined minimum value. This enables one to counteract an instability of the control, for example running up. This avoids excessively frequent switching on and off of the control function.

Advantageously, the compressor and/or the expansion valve are switched off and on depending on the temperature, the control parameter for the condenser being stored on switching off and being used again when switching on again. This ensures that during the time required by the plant to return to a run-in condition, a value is available for controlling the condenser pressure.

It is a particular advantage that a new parameter is found with a time delay after switching on again.

In a further advantageous embodiment, in a case where there is a plurality of parallel expansion valves and connected evaporators, the individual degrees of valve opening are compared with each other and the condenser pressure is controlled depending on that degree of opening which is the largest.

Figure 1A:
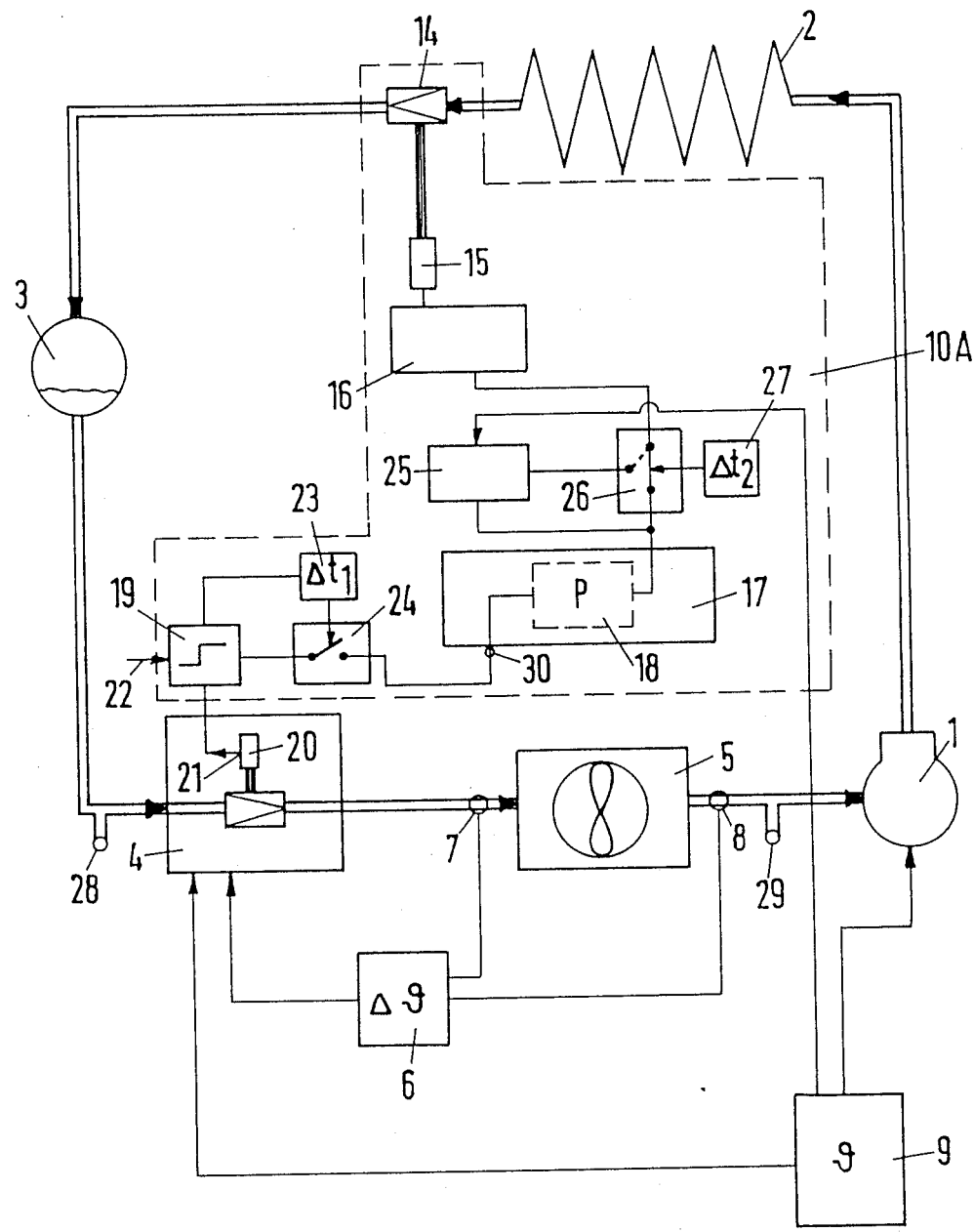
Figure 2:
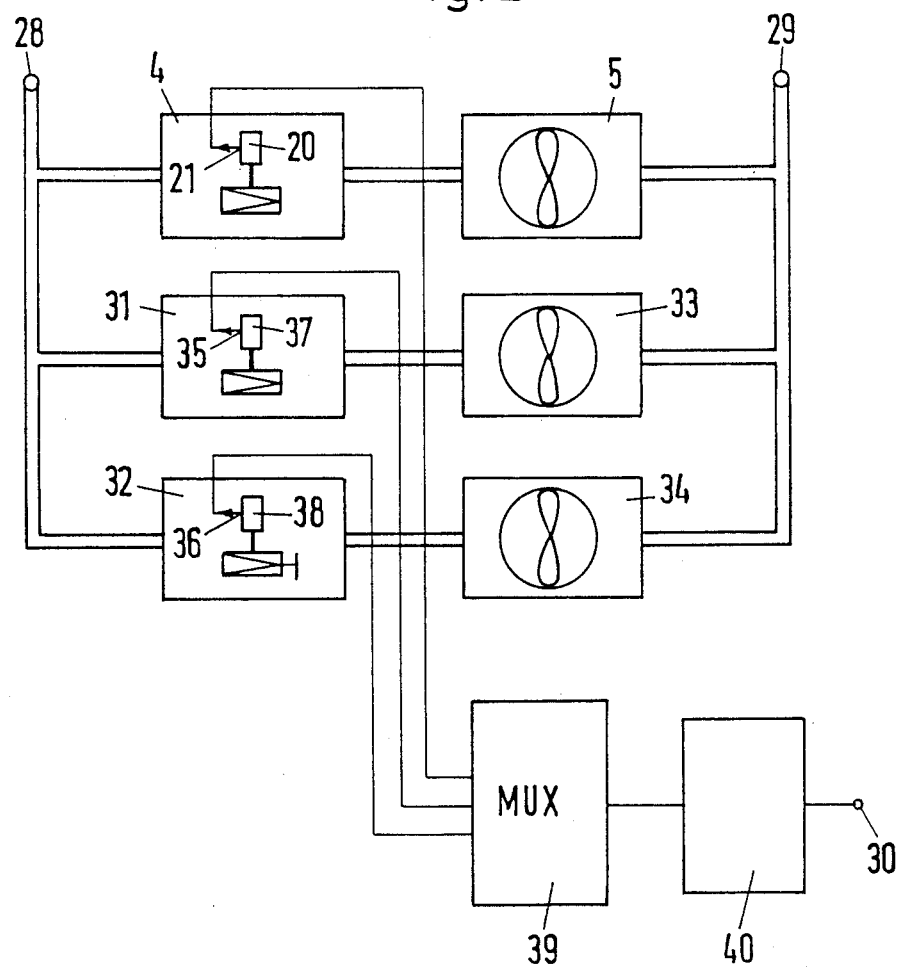

Preferred examples of the invention will now be described in conjunction with the drawing, wherein:

FIG. 1 shows a refrigeration plant with a condenser pressure control according to the invention, FIG. 1A shows a refrigeration plant with a modified condenser pressure control, and FIG. 2 is a supplement for the FIG. 1 plant.

FIG. 1 illustrates a refrigeration plant comprising a compressor 1, which compresses a cooling medium and delivers it to a condenser 2. The condenser 2 is connected to a liquid separator 3 in which the cooling medium is collected. The outlet of the liquid separator 3 is connected to the inlet of an evaporator 5 by way of an expansion valve 4. From the evaporator, the cooling medium is fed to the compressor 1 again. The expansion valve 4 contols the amount of cooling medium that is evaporated in the evaporator 5. An expansion valve control 6 detects the temperature at two measuring points 7, 8 in the conduits upstream and downstream of the evaporator 5, processes same and, from the temperature difference, forms a control signal for an actuator 20 which enlarges or reduces the degree of opening of the expansion valve 4. The signal coming from the expansion valve control 6 is superimposed by a signal from a room temperature sensor or thermostat 9 which switches the expansion valve 4 and the compressor 1 off and on.

The refrigeration plant comprise a condenser pressure control apparatus 10 which increases or reduces the pressure in the condenser when a need or possibility therefore is indicated. For this purpose, the condenser pressure control apparatus 10 in FIG. 1 comprises a fan 11 which is driven by a motor 12 controlled by a fan control 13. When the fan 11 cools the condenser 2 with a large volume of air, i.e. dissipates a large amount of heat, the cooling medium condenses in the condenser 2 and the pressure drops. Conversely, the pressure in the condenser 2 rises if the volume of air from the fan 11 is reduced.

In the refrigeration plant according to FIG. 1A, modified condenser pressure control apparatus 10A is provided. In this case, a valve 14 at the outlet of the condenser 2 is opened or closed by an actuator 15 which, in turn, is again controlled by a valve control 16. When the valve 14 closes the liquid cooling medium formed in the condenser is held back so that a smaller area is available at which the volume of air from the fan 11 can dissipate heat from the gaseous cooling medium. This increases the condenser pressure. The supply of the evaporator 5 with liquid and cooled cooling medium is ensured by the liquid separator 3 which here has a buffer effect. The pressure balancing conduit and supply conduit conventionally provided between the liquid separator 3 and the outlet of the compressor 1 or the inlet of the condenser 2 are here omitted for the sake of clarity.

The fan control 13 in FIG. 1 and the valve control 16 in FIG. 16 receive an input signal from the outlet of a control circuit 17. The inlet 30 of the control circuit 17 is connected by way of a limiting value detector element 19 and a switch 24 to a degree of opening notifier 21 which determines the degree of opening of the expansion valve 4. The degree of opening notifier can scan the position of the actuator 20. Preferably, however, a pulse-controlled expansion valve 4 is employed for determing the degree of opening from the ratio between the pulse and pause.

The limiting value detector element detects the formedlimiting value. After exceeding a predetermined limiting value, it delivers a signal to a time delay element 23 which, after a predetermined interval, closes the switch 24 and feeds the control circuit 17 with the degree of opening that exceeds the predetermined limiting value. If, during the dead period $\Delta t_1$ of the time delay element 23, the degree of opening drops below the limiting value, the switch 24 is not closed. The limiting value detecting element is adjustable from the outside by a signal 22. This adjustment can be manual. However, it can also take place depending on time or periodically so that, for example, the limiting value for daytime operation is set at 6.00 am whereas the limiting value for the night-time operation is set in the evening at 10pm.

Similarly, the time of the delay element 23 may be adjustable if it turns out that the system tends to oscillate with the selected setting.

The degree of opening signal fed to the inlet 30 of the control circuit 17 is processed by a P regulator 18 which delivers an output according to the following formula:

$$A = A_{max}\left(1 - K\frac{O - V}{O - V}\right)$$

In this formula, A is the instantaneous output value, $A_{max}$ is the maximum output value, K is a constant, 0 is the instantaneous degree of opening, V is the predetermined degree of opening and $C_{max}$ is the maximum degree of opening. In other words, when the expansion valve 4 has assumed its maximum degree of opening, the fan output is throttled to its minimum value. The pressure in the condenser is thereby increased to its maximum value.

The outlet of the control circuit 17 is connected to a store 25 which receives a signal from the room thermostat 9. When the room thermostat 9 switches the compressor 1 or expansion valve 4 off, the store 25 stores the output value of the control circuit 17 available at that instant. When the compresor 1 or the expansion valve 4 is switched on again, this value is employed and fed by way of a switch 26 to the control circuits 13 and 16 of the fan 11 or the condenser output valve 14. After switching on again, the stored value is not immediately replaced by the output of the control circuit 17 but, for an adjustable duration $\Delta t_2$ produced by a time delay element 27, is still applied to the fan control 13 and/or the valve control 16. This enables one to wait until the system has again reached a run-in condition.

FIG. 1 illustrates a refrigeration plant with an evaporator 5 and associated expansion valve 4. Connections 28 and 29 are provided at which additional evaporators and expansion valves can be arranged parallel to the first evaporator 5 and the first expansion valve 4 between the liquid separator and compressor 1. These additional evaporators 33, 34 with associated expansion valves 31, 32 are illustrated in FIG. 2. The expansion valve control 6 and the room thermostat 9 are omitted from FIG. 2 for the sake of clarity.

Each expansion valve 4, 31, 32 has an expansion valve actuator 20, 37, 38. The degree of opening of the expansion valve 4, 31, 32 is detected by a degree of opening notifier 21, 35, 36 and fed through separate conduits to a multiplexer 39. The multiplexer 39 scans the individual degrees of opening notifiers 21, 35, 36 row by row and feeds the output signal to a comparator 40 which compares the degrees of opening with one another and feeds the value corresponding to the expansion valve with the most critical degree of opening to the control circuit 17 by way of the inlet 30.

We claim:

1. A refrigeration plant comprising an evaporator having an inlet and outlet, a compressor having an inlet and an outlet connected to the evaporator inlet, a condenser having an outlet and an inlet connected to the compressor outlet, a controllable expansion valve that is openable and closable, the expansion valve being connected to the outlet of the condenser and having an outlet connected to the evaporator and condenser pressure control means for controlling the condenser pressure in accordance with the degree of opening of the expansion valve to obtain an optimum ratio between the condenser pressure and the evaporator performance.

2. A refrigeration plant according to claim 1, characterized in that the control means includes a controllable variable flow fan for discharging air toward the condenser, a fan control for varying the volume of air flow from the fan and a control circuit for controlling the fan control.

3. A refrigeration plant according to claim 1, characterized in that the control circuit includes means for providing an output to at least one of the expansion valve and the compressor, and that the control means include a room temperature sensor that switches on and off at least one of the expansion valve and the compressor, depending on the room temperature and a store connected to the temperature sensor that stores the output value of the control circuit when switching off and, when switching on again, feeds the stored value as an output value to the control circuit.

4. A refrigeration plant according to claim 3, characterized in that the control means includes an operable fan for discharging air toward the condenser, a fan control for controlling the fan, an expansion valve control for controlling the expansion valve and delay means for connecting the control circuit output to at least one of the fan control and valve control a predetermined time after the switching on again.

5. A refrigeration plant according to claim 1, characterized in that there is provided a second evaporator and a second expansion valve connected to the second evaporator, the second evaporation and second expansion valve being connected in parallel the first evaporator and the first expansion valve between the condenser and compressor, the control means including means for comparing the degrees of valve opening of the expansion valves and controlling the condenser pressure in depending relationship that depends on the degree of the opening of the expansion valve that has the largest degree of opening.

6. A refrigeration plant according to claim 5, charactized in that the control means comprises a multiplexer for time serial scanning to the degree of opening of the valves.

7. A refrigeration plant according to claim 1, characterized in that control means includes a settable valve connected in the connection between the condenser outlet and the expansion valve for controlling the flow from the condenser toward the expansion valve, and an actuator for operating the settable valve and that the control circuit includes means for operating the actuator.

8. A refrigeration plant according to claim 7, characterized in that the control means includes a variable air flow fan, a limiting value detector member connected to the expansion valve, an opening notifier for determining degree of opening of the expansion valve as determined by the degree of the opening notifier and when exceeding a predetermined degree of opening, activating the control circuit.

9. A refrigeration plant according to claim 8, characterized in that the control means comprises a P regulator to provide an output value that depends on the degree of opening of the expansion valve according to the formula $$A = A_{max}\left(1 - K\frac{O - V}{O_{max} - V}\right)$$

wherein A is the instantaneous output value, $A_{max}$ is the maximum output value, K is a constant, O is the instantaneous degree of opening of the expansion valve, V is the predetermined degree of opening and $O_{max}$ is the maximum degree of opening.

10. A refrigeration plant according to claim 8, characterized in that the control means comprises a delay element disposed between the limiting value member and control circuit for delaying the activation of the control circuit until exceeding the predetermined degree of opening by a predetermined duration.

11. A refrigeration plant according to claim 8, characterized in that the expansion valve is a pluse-controlled valve and that the opening notifier comprises means for detecting the degree of opening of the expansion valve from the pulse/pause ratio.

12. A method for controlling a refrigeration plant having a plurality of expansion valves connected in parallel, comprising evaporating a cooling medium in an evaporator, compressing the evaporated medium, liquefying the compressing medium and returning the liquefied medium through an adjustable opening expansion valve to the evaporator, characterized in that the condenser pressure is in dependence on the degree of opening of the expansion valve, comparing the degrees of the valve openings and controlling the condenser pressure in dependence on the largest degree of the openings of the expansion valve.

13. A method for controlling a refrigeration plant, comprising evaporating a cooling medium in an evaporator, compressing the evaporated medium, liquefying the compressed medium and returning the liquefied medium through an adjustable opening expansion valve to the evaporator, characterized in that the condenser pressure is in dependence on the degree of opening of the expansion valve, the degree of opening of the expansion valve being controlled in dependance of the superheating of the cooling medium in the evaporator, the controlling step setting in only after a predetermined minimum value of the degree of opening.

14. A method according to claim 13, characterized in that the predetermined minimum valve is varied in accordance with time.

15. A method for controlling a refrigeration plant, comprising evaporating a cooling medium in an evaporator, compressing the evaporated medium, liquefying the compressed medium and returning the liquefied medium through an adjustable opening expansion valve to the evaporator, characterized in that the condenser pressure is in dependance on the degree of opening of the expansion valve, the degree of opening of the expansion valve being controlled in dependence of the superheating of the cooling medium in the evaporator, the controlling step setting in only a predetermined time after exceeding a predetermined minimum valve.

* * * * *